United States Patent
Ding et al.

(10) Patent No.: US 9,626,055 B2
(45) Date of Patent: Apr. 18, 2017

(54) IN-CELL TOUCH SCREEN, TOUCH DETECTION METHOD THEREOF AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Haisheng Wang, Beijing (CN); Yingming Liu, Beijing (CN); Shengji Yang, Beijing (CN); Weijie Zhao, Beijing (CN); Tao Ren, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 17 days.

(21) Appl. No.: 14/785,523

(22) PCT Filed: Mar. 13, 2015

(86) PCT No.: PCT/CN2015/074211
§ 371 (c)(1),
(2) Date: Oct. 19, 2015

(87) PCT Pub. No.: WO2016/082373
PCT Pub. Date: Jun. 2, 2016

(65) Prior Publication Data
US 2016/0306457 A1    Oct. 20, 2016

(30) Foreign Application Priority Data

Nov. 27, 2014 (CN) .......................... 2014 1 0705429

(51) Int. Cl.
G06F 3/041 (2006.01)
G06F 3/044 (2006.01)

(52) U.S. Cl.
CPC ............ G06F 3/044 (2013.01); G06F 3/0412 (2013.01); G06F 3/0416 (2013.01); *G06F 2203/04104* (2013.01)

(58) Field of Classification Search
CPC ............................... G06F 3/044; G06F 3/0416
(Continued)

(56) References Cited

U.S. PATENT DOCUMENTS 8,723,825 B2   5/2014 Wright et al.
9,310,952 B2   4/2016 Hanauer et al.
(Continued)

FOREIGN PATENT DOCUMENTS

CN   101847071 A   9/2010
CN   101882039 A   11/2010
(Continued)

OTHER PUBLICATIONS

Chinese Office Action in Chinese Application No. 201410705429, mailed Oct. 9, 2016 with English translation.
(Continued)

*Primary Examiner* — Calvin C Ma
(74) *Attorney, Agent, or Firm* — Collard & Roe, P.C.

(57) ABSTRACT

An in-cell touch screen, a touch detection method thereof and a display device are disclosed, the in-cell touch screen comprising: an array substrate and an opposed substrate arranged opposite to each other; a self-capacitance electrode pattern (100, 200), disposed on a side of the array substrate facing the opposed substrate and/or a side of the opposed substrate facing the array substrate, including: a plurality of first self-capacitance electrodes (100), each of the first self-capacitance electrodes (100) being a strip electrode, a
(Continued)

plurality of second self-capacitance electrodes (200), each of the second self-capacitance electrodes including a plurality of block electrodes (210) electrically connected with each other; and a touch detecting chip, configured to judge a touch position according to signal variation of the self-capacitance electrode pattern, wherein orthogonal projections of each of the first self-capacitance electrodes (100) and each of the second self-capacitance electrodes (200) on the array substrate cross to each other, and each of the first self-capacitance electrodes (100) and each of the second self-capacitance electrodes (200) are connected with the touch detecting chip through periphery wirings (300), respectively. The in-cell touch screen according to an embodiment of the present disclosure varies the self-capacitance electrode pattern, which can significantly reduce the number of the periphery wirings, and is conducive to narrow frame design; moreover, time required for touch detection can be greatly reduced in a mode of switching self capacitance and mutual capacitance.

13 Claims, 4 Drawing Sheets

(58) Field of Classification Search
USPC .................. 324/600, 686; 345/156, 173–174
See application file for complete search history.

(56) References Cited

U.S. PATENT DOCUMENTS

| | | |
|---|---|---|
| 2010/0328262 A1 | 12/2010 | Huang et al. |
| 2012/0146942 A1 | 6/2012 | Kamoshida et al. |

FOREIGN PATENT DOCUMENTS

| | | |
|---|---|---|
| CN | 101882041 A | 11/2010 |
| CN | 102023768 A | 4/2011 |
| CN | 102375629 A | 3/2012 |
| CN | 102782626 A | 11/2012 |
| CN | 102945106 A | 2/2013 |
| CN | 103034358 A | 4/2013 |
| CN | 103049157 A | 4/2013 |
| CN | 103076939 A | 5/2013 |
| CN | 104331210 A | 2/2015 |

OTHER PUBLICATIONS

International Search Report of PCT/CN2015/074211 in Chinese, mailed Aug. 18, 2015 with English translation.
Notice of Transmittal of the International Search Report of PCT/CN2015/074211 in Chinese, mailed Aug. 18, 2015.
Written Opinion of the International Searching Authority of PCT/CN2015/074211 in Chinese, mailed Aug. 18, 2015 with English translation.

IN-CELL TOUCH SCREEN, TOUCH DETECTION METHOD THEREOF AND DISPLAY DEVICE

CROSS REFERENCE TO RELATED APPLICATIONS

This application is the National Stage of PCT/CN2015/074211 filed on Mar. 13, 2015, which claims priority under 35 U.S.C. §119 of Chinese Application No. 201410705429.0 filed on Nov. 27, 2014, the disclosure of which is incorporated by reference.

TECHNICAL FIELD

Embodiments of the present disclosure relate to an in-cell touch screen, a touch detection method thereof and a display device.

BACKGROUND

At present, an existing in-cell touch screen detects a touch position of a finger on a principle of mutual capacitance or self capacitance. Therein, the touch screen on the principle of self capacitance may comprise a plurality of self-capacitance electrodes, which are disposed in a same layer and insulated from each other, disposed therein; when the human body does not touch the screen, a capacitance of each of the self-capacitance electrodes is a fixed value; when the human body touches the screen, the capacitance of the corresponding self-capacitance electrode is the fixed value superimposed with the human body capacitance, and a touch detecting chip can judge the touch position in a touch period by detecting variation of capacitance value of each of the self-capacitance electrodes. Since the human body capacitance may act on all of the self capacitances, as compared with a case that the human body capacitance may only act on a projected capacitance in the mutual capacitance, a touch variation amount caused by the human body touching the screen will be greater than that of the touch screen fabricated on the principle of mutual capacitance, and thus, as compared with the touch screen of the mutual capacitance, the touch screen on the principle of self capacitance can effectively improve a signal to noise ratio of the touch, so as to improve accuracy of touch sensing.

When the touch screen is designed on the principle of self capacitance, each self-capacitance electrode needs to be connected with a touch detecting chip through a individual lead, and as show in FIG. 1, each lead may include: a conducting line 2 which connects a self-capacitance electrode 1 to a frame of the touch screen, and a periphery wiring 4 disposed at the frame of the touch screen which couples the self-capacitance electrode 1 to a connecting terminal 3 of the touch detecting chip.

Since the number of the self-capacitance electrodes is very large, the number of the corresponding leads will also be very large; with a case that an area of each self-capacitance electrode is 5 mm*5 mm as an example, a 5-inch liquid crystal display screen needs 264 self-capacitance electrodes; and if each self-capacitance electrode is designed to be smaller, there will be more self-capacitance electrodes, then it is necessary to provide more leads. When being designed, in order to reduce the number of film layers, the conducting lines in the leads and the self-capacitance electrodes are typically disposed in a same layer; more conducting lines will result in a larger touch dead zone, which refers to a region where wiring lines are concentrated in the touch screen; in this touch dead zone, signals are relatively more disordered, and thus, it is referred to as the touch dead zone, that is, touch performance within the region cannot be guaranteed. FIG. 1 is illustrated with 30 self-capacitance electrodes as an example, the 30 self-capacitance electrodes need 30 conducting lines to connect them to the frame, and 10 conducting lines are needed in a region where the conducting lines are densest, which will result in a larger touch dead zone.

In addition, since the number of the conducting lines is larger, the number of the periphery wirings disposed at the frame and corresponding to the conducting lines in a one-to-one relationship correspondence is also larger, which will cause expansion of the frame of the touch screen, and is not conducive to narrow frame design.

Thus, it is necessary to reduce the number of the leads of the self-capacitance electrodes in the touch screen, under a circumstance that a distribution density of the self-capacitance electrodes in the touch screen is ensured, so as to implement the narrow frame design.

SUMMARY

Embodiments of the present disclosure provide an in-cell touch screen, a touch detection method thereof and a display device, which can reduce the number of the leads of the self-capacitance electrodes in the touch screen, and is conducive to the narrow frame design.

In one aspect, an embodiment of the present disclosure provides an in-cell touch screen, comprising: an array substrate and an opposed substrate arranged opposite to each other; a self-capacitance electrode pattern, disposed on a side of the array substrate facing the opposed substrate and/or a side of the opposed substrate facing the array substrate, including: a plurality of first self-capacitance electrodes, each of the first self-capacitance electrodes being a strip electrode, a plurality of second self-capacitance electrodes, each of the second self-capacitance electrodes including a plurality of block electrodes electrically connected with each other; and a touch detecting chip, configured to judge a touch position according to signal variation of the self-capacitance electrode pattern, wherein orthogonal projections of each of the first self-capacitance electrodes and each of the second self-capacitance electrodes are arranged intersecting with each other on the array substrate, and each of the first self-capacitance electrodes and each of the second self-capacitance electrodes are connected with the touch detecting chip through periphery lines, respectively.

In another aspect, an embodiment of the present disclosure provides a display device, comprising the above-described in-cell touch screen.

In still another aspect, an embodiment of the present disclosure provides a touch detection method of the above-described in-cell touch screen, comprising: in a touch period, loading a touch detection signal for each of the first self-capacitance electrodes and each of the second self-capacitance electrodes, and determining a touch point position where touch likely occurs in the touch screen according to variation of feedback signals of each of the first self-capacitance electrodes and each of the second self-capacitance electrodes; judging to determine whether the touch point position where the touch likely occurs is unique or not; outputting the touch point position, if the position is unique; and loading a touch scanning signal for each of the second self-capacitance electrodes, and detecting a voltage signal output by each of the first self-capacitance electrodes sensing the touch scanning signal, if the position is not unique; or loading the touch scanning signal for each of the first self-capacitance electrodes, and detecting the voltage signal output by each of the second self-capacitance electrodes sensing the touch scanning signal; and judging a touch point position actually touched in the touch point positions where the touch likely occurs according to variation of the voltage signal, and outputting the position.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
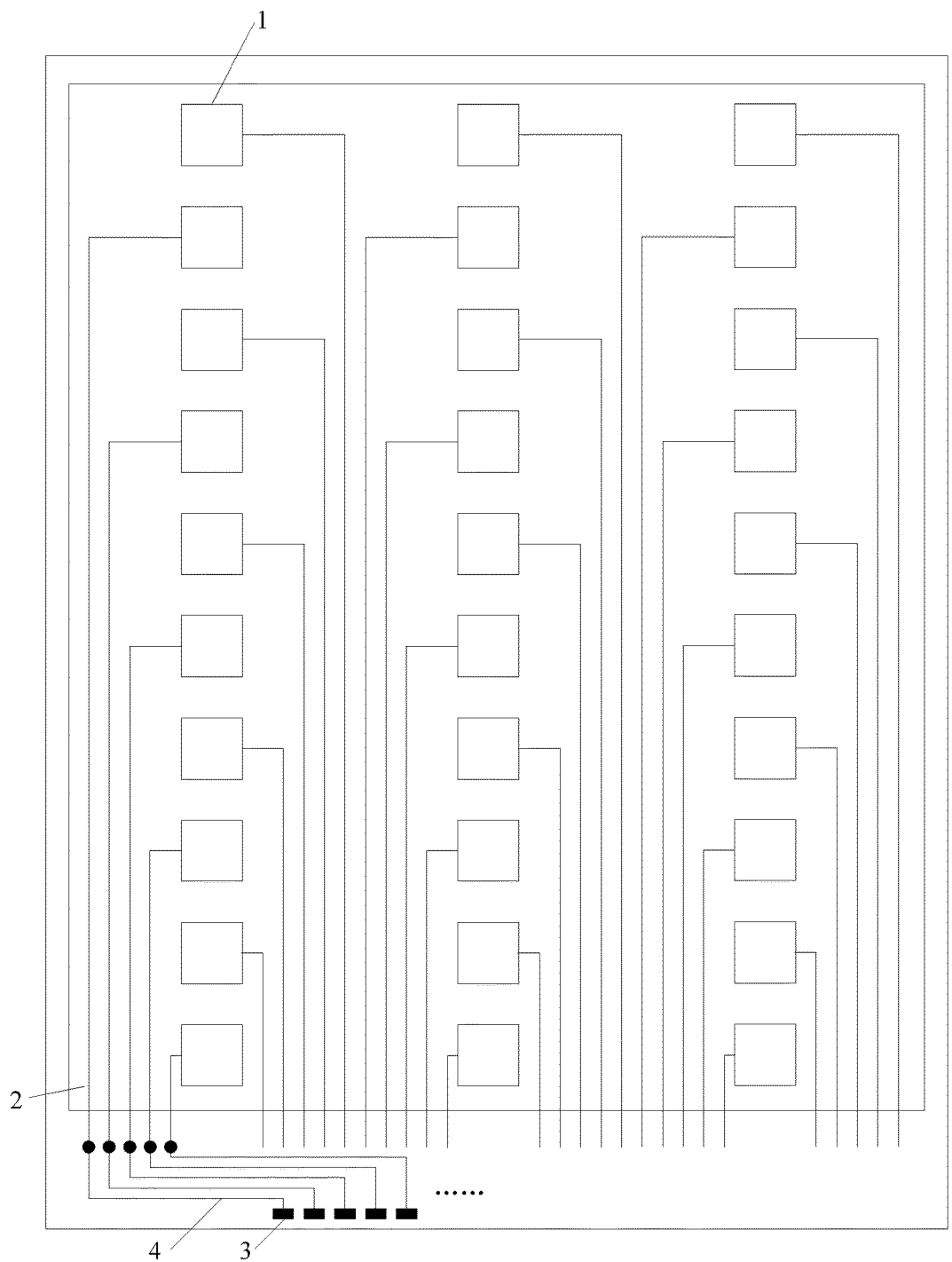
FIG. 1 is a top-view structural schematic diagram of a self-capacitance electrode in an existing touch screen.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, the in-cell touch screen, the touch detection method thereof and the display device provided by embodiments of the present disclosure are illustrated in detail.

Thickness and shape of each of film layers in the drawings do not reflect true proportions, but are only intended to illustrate contents of the present disclosure.

An embodiment of the present disclosure provides an in-cell touch screen, comprising: an array substrate and an opposed substrate arranged opposite to each other; a self-capacitance electrode pattern, disposed on a side of the array substrate facing the opposed substrate and/or a side of the opposed substrate facing the array substrate, and a touch detecting chip, for judging a touch position according to signal variation on the self-capacitance electrode pattern.

Figure 2:
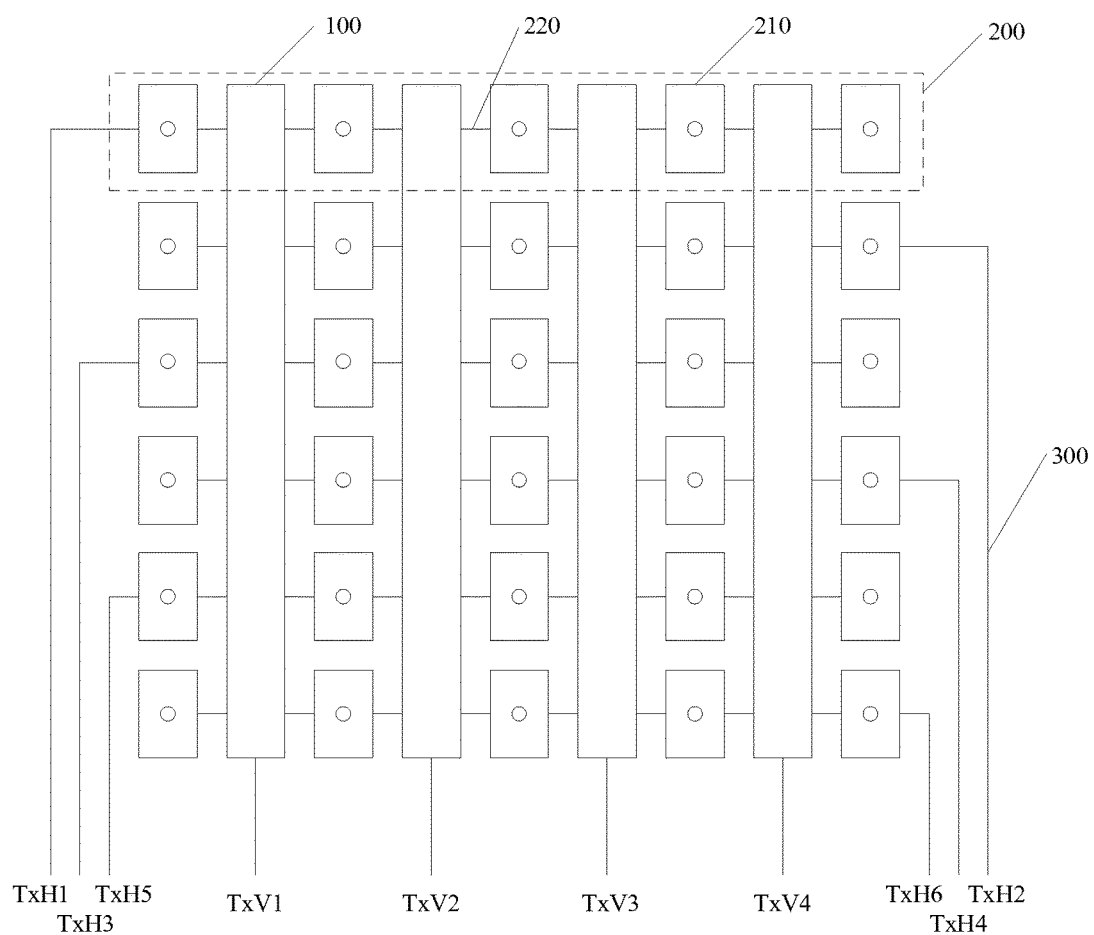
FIG. 2 is a structural schematic diagram I of a self-capacitance electrode pattern in an in-cell touch screen provided by an embodiment of the present disclosure.

As shown in FIG. 2, the self-capacitance electrode pattern includes a plurality of first self-capacitance electrodes 100 and a plurality of second self-capacitance electrodes 200, orthogonal projections of each first self-capacitance electrode 100 and each second self-capacitance electrode 200 being arranged intersecting with each other on the array substrate, wherein, each first self-capacitance electrode 100 is a strip electrode, and each second self-capacitance electrode 200 includes a plurality of block electrodes 210 electrically connected with each other.

Exemplarily, orthogonal projections of the plurality of block electrodes 210 included in each second self-capacitance electrode 200 on the array substrate and the orthogonal projections of the first self-capacitance electrodes 100 are alternately arranged, and the plurality of block electrodes 210 are electrically connected with each other through, for example, a conducting line 220. FIG. 2 is illustrated with a case that the self-capacitance electrode pattern includes 4 first self-capacitance electrodes TxV1 . . . TxV2, 6 second self-capacitance electrodes TxH1 . . . TxH6, and each of the second self-capacitance electrodes 200 comprises 5 block electrodes as an example.

As shown in FIG. 2, the first self-capacitance electrodes 100 and the second self-capacitance electrodes 200 are connected with a touch detecting chip (not shown in FIG. 2) through a periphery wiring 300, respectively.

The above-described in-cell touch screen provided by an embodiment of the present disclosure varies the self-capacitance electrode pattern, from the existing self-capacitance electrode pattern which entirely consists of the block electrodes, to the self-capacitance electrode pattern which consists of partially the block electrodes and partially the strip electrodes, makes the block electrodes connected through the conducting line to be equivalent to the strip electrode, and then connects the (equivalent) strip electrode with the touch detecting chip through the periphery wiring, which, as compared with the existing design in which each of the block self-capacitance electrodes needs to be connected with the touch detecting chip through an individual wiring, can significantly reduce the number of the periphery wirings, and is conducive to the narrow frame design.

Exemplarily, the first self-capacitance electrodes 100 and the second self-capacitance electrodes 200 in the self-capacitance electrode pattern of the in-cell touch screen provided by the embodiment of the present disclosure may be simultaneously disposed on the side of the array substrate facing the opposed substrate or be simultaneously disposed on the side of the opposed substrate facing the array substrate, for example, the first self-capacitance electrodes 100 and the second self-capacitance electrodes 200 may be disposed in a same layer, which thus is conducive to reduction of the number of film layers added in a display panel, and is conducive to cost saving.

Exemplarily, the self-capacitance electrode pattern may also be disposed in different layers according to an actual design need, for example, the first self-capacitance electrodes 100 in the touch electrode pattern may be disposed on the side of the opposed substrate facing the array substrate, and the second self-capacitance electrodes 200 in the touch electrode pattern may be disposed on the side of the array substrate facing the opposed substrate. Alternatively, the first self-capacitance electrodes 100 in the touch electrode pattern may be disposed on the side of the array substrate facing the opposed substrate, and the second self-capacitance electrodes 200 in the touch electrode pattern may be disposed on the side of the opposed substrate facing the array substrate.

Exemplarily, in order to ensure that the self-capacitance electrode pattern added in the above-described in-cell touch screen provided by the embodiment of the present disclosure will not affect an aperture ratio, a black matrix pattern may be disposed on the side of the opposed substrate facing the array substrate; when the first self-capacitance electrodes 100 and the second self-capacitance electrodes 200 in the self-capacitance electrode pattern are simultaneously disposed on the side of the opposed substrate facing the array substrate, the first self-capacitance electrodes 100 and the second self-capacitance electrodes 200 may have a latticed structure covered by the black matrix pattern; or, when only the first self-capacitance electrodes 100 in the self-capacitance electrode pattern are disposed on the side of the opposed substrate facing the array substrate, the first self-capacitance electrodes 100 have the latticed structure covered by the black matrix pattern.

Further, in order to reduce the number of new film layers added in the display panel when a touch function is implemented, for example, when the first self-capacitance electrodes 100 and the second self-capacitance electrodes 200 in the self-capacitance electrode pattern are simultaneously disposed on the side of the array substrate facing the opposed substrate, a common electrode layer located on the array substrate may be divided as the self-capacitance electrode pattern, i.e., the common electrode layer is used as both the self-capacitance electrode pattern and the common electrode, for example, in a display period, the common electrode layer is used as the common electrode, and in the touch period, the common electrode layer is used as the self-capacitance electrode pattern; or, when only the second self-capacitance electrodes 200 in the self-capacitance electrode pattern are disposed on the side of the array substrate facing the opposed substrate, the common electrode layer located on the array substrate may be divided as the second self-capacitance electrodes 200 in the self-capacitance electrode pattern and the common electrodes, for example, orthogonal projections of the common electrodes and the first self-capacitance electrodes 100 on the array substrate coincide with each other, that is, a pattern of the common electrode and a pattern of the first self-capacitance electrode 100 are consistent.

Exemplarily, extending directions of the first self-capacitance electrode 100 and the second self-capacitance electrode 200 in the self-capacitance electrode pattern may be designed according to an actual need, as shown in FIG. 2, the extending direction of the first self-capacitance electrode 100 may be set as a longitudinal direction, and correspondingly the extending direction of the second self-capacitance electrode 200 may be set as a lateral direction; and thus, the conducting line 220 connecting the block electrodes 210 in a same second self-capacitance electrode 200 may be disposed in a same layer with a gate line in the array substrate. The extending direction of the first self-capacitance electrode 100 may also be set as the lateral direction, and correspondingly the extending direction of the second self-capacitance electrode 200 may be set as the longitudinal direction; and thus, the conducting line 220 connecting the block electrodes 210 in the same second self-capacitance electrode 200 may be disposed in a same layer with a data line in the array substrate.

Further, in the above-described in-cell touch screen provided by the embodiment of the present disclosure, when the extending direction of the first self-capacitance electrode 100 is set as the longitudinal direction, and correspondingly the extending direction of the second self-capacitance electrode 200 is set as the lateral direction, in order to further reduce a size of the frame, the periphery wirings coupling the second self-capacitance electrodes 200 to the touch detecting chip may be distributed on both sides of the second self-capacitance electrodes 200, respectively, for example, as shown in FIG. 2, the periphery wiring connecting an odd-numbered row of the second self-capacitance electrode 200 is arranged at a left frame, and the periphery wiring connecting an even-numbered row of the second self-capacitance electrode 200 is arranged at a right frame.

Figure 3:
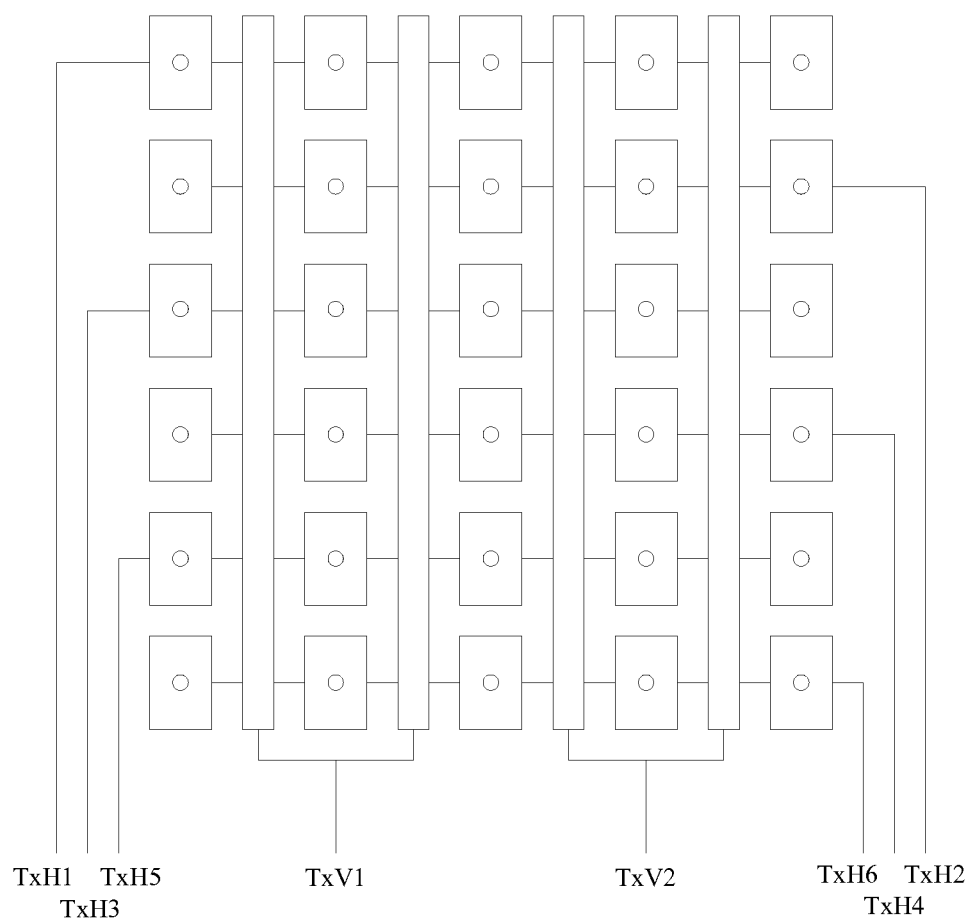
FIG. 3 is a structural schematic diagram II of the self-capacitance electrode pattern in the in-cell touch screen provided by the embodiment of the present disclosure.

Further, in order to improve detection accuracy of the self-capacitance electrode pattern, to achieve detection accuracy greater than accuracy in an actual self-capacitance electrode pattern, for example, a width of each first self-capacitance electrode 100 may be set as half a width of an adjacent block electrode, and as shown in FIG. 3, at this time, every two adjacent first self-capacitance electrodes 100 are taken as one group, which is connected with the touch detecting chip through one periphery wiring, that is, as shown in FIG. 3, two self-capacitance electrodes are taken as one group of self-capacitance electrodes, which can improve the accuracy of touch detection.

Figure 4:
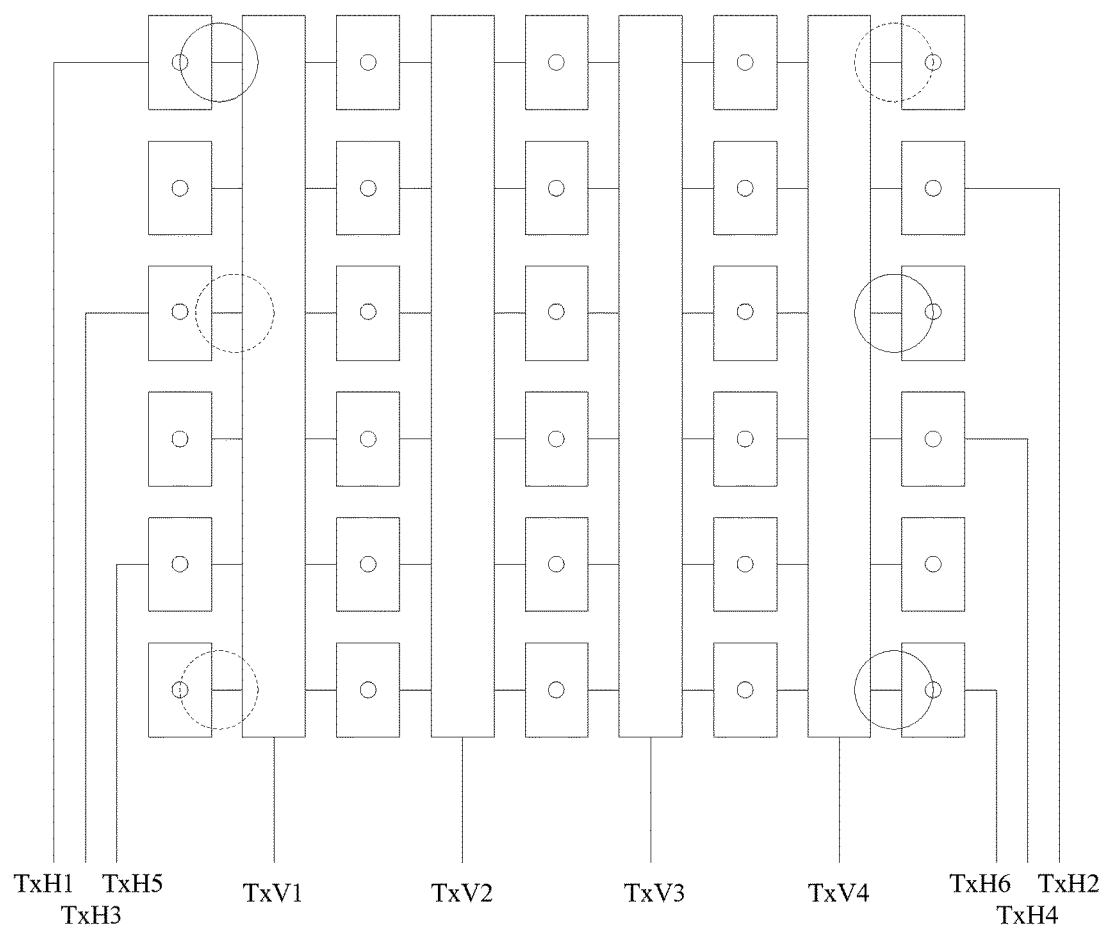
FIG. 4 is a schematic diagram of multi-touch occurring in the self-capacitance electrode pattern provided by the embodiment of the present disclosure.

Based on a self-capacitance detection principle, when touch detection is performed by the above-described self-capacitance electrode pattern provided by the embodiment of the present disclosure, a detection signal is loaded for each first self-capacitance electrode 100 and each second self-capacitance electrode 200, one axis coordinate of touch is determined according to feedback signal variation of the first self-capacitance electrodes 100, another axis coordinate is determined according to feedback signal variation of the second self-capacitance electrodes 200, and finally, the touch point position is determined according to the two axis coordinates. However, when detection is performed in the above-described driving mode, a ghost point problem will appear when multi-touch occurs; as shown in FIG. 4, when the touch occurs at regions where 3 solid circles are located, the feedback signals of the second self-capacitance electrodes TXH1, TXH3 and TXH6 all vary, and the feedback signals of the first self-capacitance electrodes TxV1 and TxV4 vary as well; in this way, it may be derived that the touch also probably occurs in regions where three dotted circles are located in FIG. 3 through data analysis, and thus, it cannot be determined specifically in which 3 regions the touch occurs among the regions where 6 circles are located.

Thus, for the problem that the ghost point will occur when touch detection is performed on the above-described self-capacitance electrode pattern provided by the embodiment of the present disclosure on the principle of self-capacitance detection, an embodiment of the present disclosure further provides a corresponding touch detection method. The method performs initial detection by taking advantage of short detection time of the self-capacitance electrode firstly, when a plurality of touch point positions where the touch likely occurs are detected, performs detection again with the self-capacitance electrode pattern as the mutual capacitance, and excludes a ghost point position in a mode of mutual capacitance detection, so that the touch detection is more accurate; and time required for the touch detection may be greatly reduced in the above-described mode of switching the self capacitance and the mutual capacitance.

Exemplarily, the touch detection method of the above-described in-cell touch screen provided by an embodiment of the present disclosure comprises steps of:

S501: in a touch period, loading a touch detection signal for each first self-capacitance electrode and each second self-capacitance electrode, and determining a touch point position where touch likely occurs in the touch screen according to variation of feedback signals of each first self-capacitance electrode and each second self-capacitance electrode;

For example, the touch detection signals may be loaded simultaneously for the first self-capacitance electrodes and the second self-capacitance electrodes, and the touch detection signals may also be loaded successively for the first self-capacitance electrodes and the second self-capacitance electrodes, which will not be limited here;

S502: judging whether the touch point position where the touch likely occurs is unique or not; if yes, proceeding to step S503; if no, proceeding to step S504;

S503: outputting the touch point position, wherein, since there is only one touch point, and there is no ghost point problem, the touch point position touched by a single finger may be output directly;

S504: loading a touch scanning signal for the second self-capacitance electrodes, and detecting a voltage signal output by the first self-capacitance electrodes sensing the touch scanning signal; or loading the touch scanning signal for the first self-capacitance electrodes, and detecting a voltage signal output by the second self-capacitance electrodes sensing the touch scanning signal; detecting in a mode of mutual capacitance, so that an actual touch point position may be determined;

S505: excluding the ghost point position according to variation of the voltage signal, and then outputting the actual touch point position.

Exemplarily, it may be determined whether to select the first self-capacitance electrode as a touch driving electrode or to select the second self-capacitance electrode as the touch driving electrode by using steps below, so as to better distinguish the ghost point and an actual touch point:

Firstly, it is determined whether the number of electrodes whose feedback signal varies among the first self-capacitance electrodes is greater than the number of electrodes whose feedback signal varies among the second self-capacitance electrodes; for example, in a position where touch is located as shown in FIG. 4, the first self-capacitance electrodes whose feedback signal varies are TXV1 and TXV4, and the second self-capacitance electrodes whose feedback signal varies are TXH1, TXH3 and TXH6, then the number of the electrodes whose feedback signal varies among the first self-capacitance electrodes is less than the number of the electrodes whose feedback signal varies among the second self-capacitance electrodes;

When the number of the electrodes whose feedback signal varies among the first self-capacitance electrodes is greater than the number of the electrodes whose feedback signal varies among the second self-capacitance electrodes, the touch scanning signal is loaded for the second self-capacitance electrode, and the voltage signal output by the first self-capacitance electrode sensing the touch scanning signal is detected, that is, the second self-capacitance electrode is used as the touch driving electrode, and the first self-capacitance electrode is used as the touch sensing electrode;

When the number of the electrodes whose feedback signal varies among the first self-capacitance electrodes is no greater than the number of the electrodes whose feedback signal varies among the second self-capacitance electrodes, the touch scanning signal is loaded for the first self-capacitance electrode, and the voltage signal output by the second self-capacitance electrode sensing the touch scanning signal is detected, that is, the first self-capacitance electrode is used as the touch driving electrode, and the second self-capacitance electrode is used as the touch sensing electrode, which is a case as shown in FIG. 4, for example.

Based on a same inventive concept, an embodiment of the disclosure further provides a display device, comprising the above-described touch screen provided by the embodiment of the present disclosure, and the display device may be: a mobile phone, a tablet personal computer, a television, a display, a notebook computer, a digital photo frame, a navigator, and any other product or component having a display function. The embodiment of the above-described touch screen may be referred to for implementation of the display device, and repeated parts will not be illustrated here.

The embodiments of the present disclosure provide the in-cell touch screen, the touch detection method thereof and the display device, the self-capacitance electrode pattern is set as the first self-capacitance electrodes and the second self-capacitance electrodes whose orthogonal projections are crossed to each other on the array substrate; wherein, each of the first self-capacitance electrodes are a strip electrode, each of the second self-capacitance electrodes includes a plurality of block electrodes, and the orthogonal projections of the block electrodes included by the same second self-capacitance electrode and the orthogonal projections of the first self-capacitance electrodes are alternately arranged on the array substrate, and the block electrodes are electrically connected with each other through the conducting lines; in this way, the first self-capacitance electrodes and the second self-capacitance electrodes whose patterns are varied are respectively connected with the touch detecting chip through the periphery wirings, which, as compared with the existing design in which the self-capacitance electrode pattern is the block electrode, and each of the electrodes needs to be connected with the touch detecting chip through an individual wiring, can significantly reduce the number of the periphery wirings, and is conducive to the narrow frame design.

In addition, for the problem that the ghost point will occur when touch detection is performed on the above-described self-capacitance electrode pattern, the embodiment of the present disclosure further provides the corresponding touch detection method, which performs the initial detection by taking advantage of the short detection time of the self-capacitance electrode firstly, when the plurality of touch point positions where the touch likely occurs are detected, performs detection again with the self-capacitance electrode pattern as the mutual capacitance, and excludes the ghost point position in a mode of mutual capacitance detection, so that the touch detection is more accurate; and the time required for the touch detection may be greatly reduced in above-described mode of switching the self capacitance and the mutual capacitance.

It is evident that one person skilled in the art can make various changes or modifications to the present disclosure without departing from the spirit and scope of the present disclosure. Thus, if these changes and modifications to the present disclosure are within the scope of the claims of the present disclosure and equivalents thereof, the present disclosure also intends to include all such changes and modifications within its scope.

The present application claims priority of Chinese Patent Application No. 201410705429.0 filed on Nov. 27, 2014, the disclosure of which is incorporated herein by reference in its entirety as part of the present application.

The invention claimed is:

1. An in-cell touch screen, comprising:
an array substrate and an opposed substrate, arranged opposite to each other;
a self-capacitance electrode pattern, disposed on a side of the array substrate facing the opposed substrate and/or a side of the opposed substrate facing the array substrate, comprising:
a plurality of first self-capacitance electrodes, each of the first self-capacitance electrodes being a strip electrode,
a plurality of second self-capacitance electrodes, each of the second self-capacitance electrodes including a plurality of block electrodes electrically connected with each other; and a touch detecting chip, configured to judge a touch position according to signal variation of the self-capacitance electrode pattern, wherein orthogonal projections of each of the first self-capacitance electrodes and each of the second self-capacitance electrodes on the array substrate cross to each other, and each of the first self-capacitance electrodes and each of the second self-capacitance electrodes are connected with the touch detecting chip through periphery wiring, respectively.

2. The in-cell touch screen according to claim 1, wherein orthogonal projections of the plurality of block electrodes included in each of the second self-capacitance electrodes and the orthogonal projections of the plurality of first self-capacitance electrodes on the array substrate are alternately arranged.

3. The in-cell touch screen according to claim 1, wherein the plurality of first self-capacitance electrodes and the plurality of second self-capacitance electrodes are simultaneously disposed on the side of the array substrate facing the opposed substrate, or on the side of the opposed substrate facing the array substrate; or, the plurality of first self-capacitance electrodes are disposed on the side of the opposed substrate facing the array substrate, and the plurality of second self-capacitance electrodes are disposed on the side of the array substrate facing the opposed substrate.

4. The in-cell touch screen according to claim 3, wherein a black matrix pattern is disposed on the side of the opposed substrate facing the array substrate;

when the plurality of first self-capacitance electrodes and the plurality of second self-capacitance electrodes are simultaneously disposed on the side of the opposed substrate facing the array substrate, the plurality of first self-capacitance electrodes and the plurality of second self-capacitance electrodes have a latticed structure covered by the black matrix pattern;

when only the plurality of first self-capacitance electrodes are disposed on the side of the opposed substrate facing the array substrate, the plurality of first self-capacitance electrodes have the latticed structure covered by the black matrix pattern.

5. The in-cell touch screen according to claim 3, wherein when the plurality of first self-capacitance electrodes and the plurality of second self-capacitance electrodes are simultaneously disposed on the side of the array substrate facing the opposed substrate, a common electrode layer located on the array substrate is divided as the self-capacitance electrode pattern;

when only the second self-capacitance electrodes in the self-capacitance electrode pattern are disposed on the side of the array substrate facing the opposed substrate, the common electrode layer located on the array substrate is divided as the second self-capacitance electrodes in the self-capacitance electrode pattern and a common electrode.

6. The in-cell touch screen according to claim 5, wherein orthogonal projections of the common electrode and each of the first self-capacitance electrodes on the array substrate coincide with each other.

7. The in-cell touch screen according to claim 5, wherein an extending direction of each of the first self-capacitance electrodes is a lateral direction, an extending direction of each of the second self-capacitance electrodes is a longitudinal direction, and a conducting line connecting the plurality of block electrodes in each of the second self-capacitance electrodes is disposed in a same layer with a data line in the array substrate; or, the extending direction of each of the first self-capacitance electrodes is the longitudinal direction, the extending direction of each of the second self-capacitance electrodes is the lateral direction, and the conducting line connecting the plurality of block electrodes in each of the second self-capacitance electrodes is disposed in a same layer with a gate line in the array substrate.

8. The in-cell touch screen according to claim 1, wherein the plurality of first self-capacitance electrodes are disposed on the side of the array substrate facing the opposed substrate, and the plurality of second self-capacitance electrodes are disposed on the side of the opposed substrate facing the array substrate.

9. The in-cell touch screen according to claim 1, wherein the extending direction of each of the first self-capacitance electrodes is a longitudinal direction, the extending direction of each of the second self-capacitance electrodes is a lateral direction, and the periphery wirings connecting each of the second self-capacitance electrodes with the touch detecting chip are distributed on both sides of the plurality of second self-capacitance electrodes, respectively.

10. The in-cell touch screen according to claim 1, wherein a width of each of the first self-capacitance electrodes is half of a width of each adjacent block electrode, and every two adjacent first self-capacitance electrodes are taken as one group, which is connected with the touch detecting chip through one periphery wiring.

11. A display device, comprising the in-cell touch screen according to claim 1.

12. A touch detection method of the in-cell touch screen according to claim 1, comprising:

in a touch period, loading a touch detection signal for each of the first self-capacitance electrodes and each of the second self-capacitance electrodes, and determining a touch point position where touch likely occurs in the touch screen according to variation of feedback signals of each of the first self-capacitance electrodes and each of the second self-capacitance electrodes;

judging whether the touch point position where the touch likely occurs is unique or not;

outputting the touch point position, if the position is unique;

loading a touch scanning signal for each of the second self-capacitance electrodes, and detecting a voltage signal output by each of the first self-capacitance electrodes sensing the touch scanning signal, if the position is not unique; or loading the touch scanning signal for each of the first self-capacitance electrodes, and detecting a voltage signal output by each of the second self-capacitance electrodes sensing the touch scanning signal, if the position is not unique; and judging an actual touch point position actually touched in the touch point positions where the touch likely occurs according to variation of the voltage signal, and outputting the actual touch point position.

13. The method according to claim 12, wherein after it is determined that the touch point position where the touch likely occurs is not unique, the method further comprises:

determining whether a number of first self-capacitance electrodes whose feedback signal varies among the plurality of first self-capacitance electrodes is greater than a number of second self-capacitance electrodes whose feedback signal varies among the plurality of second self-capacitance electrodes;

loading the touch scanning signal for each of the second self-capacitance electrodes, and detecting the voltage signal output by each of the first self-capacitance electrodes sensing the touch scanning signal, if the number of the first self-capacitance electrodes whose feedback signal varies is greater than the number of the second self-capacitance electrodes whose feedback signal varies;

loading the touch scanning signal for each of the first self-capacitance electrodes, and detecting the voltage signal output by each of the second self-capacitance electrodes sensing the touch scanning signal, if the number of the first self-capacitance electrodes whose feedback signal varies is less than or equal to the number of the second self-capacitance electrodes whose feedback signal varies.

\* \* \* \* \*